United States Patent [19]

Gosselin

[11] Patent Number: 4,758,622

[45] Date of Patent: Jul. 19, 1988

[54] PROTECTIVE COATING HAVING NON-STICK SURFACE, ITS PROCESS OF MANUFACTURE, AND AN ARTICLE COATED THEREWITH

[76] Inventor: Claude Gosselin, 18 rue de Bousbecque, 59126 Linselles, France

[21] Appl. No.: 13,684

[22] Filed: Feb. 11, 1987

[30] Foreign Application Priority Data

Feb. 11, 1986 [FR] France .................. 86 01852

[51] Int. Cl.$^4$ .......................... C08G 18/02
[52] U.S. Cl. ............................ 524/716; 524/718; 524/759; 524/770; 524/773; 524/789; 524/791; 528/48; 528/58; 528/67; 252/182.21; 106/18.32; 106/18.33
[58] Field of Search ............ 524/716, 718, 759, 770, 524/773, 789, 791; 528/48, 58, 67; 252/182

[56] References Cited

U.S. PATENT DOCUMENTS 3,706,710 12/1972 Camilleri et al. ............ 260/75

FOREIGN PATENT DOCUMENTS 0085309 3/1984 European Pat. Off. .
3339683 5/1985 Fed. Rep. of Germany .
2463167 2/1981 France .

*Primary Examiner*—Maurice J. Welsh
*Attorney, Agent, or Firm*—Sandler & Greenbaum

[57] ABSTRACT

A protective composition which comprises at least one aliphatic polyisocyanate, at least one aromatic polyisocyanate and a solvent.

43 Claims, No Drawings

PROTECTIVE COATING HAVING NON-STICK SURFACE, ITS PROCESS OF MANUFACTURE, AND AN ARTICLE COATED THEREWITH

BACKGROUND OF THE INVENTION

1. Field of the Invention

The present invention relates to a protective coating which has an external non-stick surface. It relates likewise to the process for the manufacture of this coating and an article coated therewith.

2. Description of Background and Relevant Materials

It has long been known to coat all sorts of supports with a protective coating against natural and artificial damage, particularly chemical damage or that resulting from vandalism.

A first type of known coating comprises a paint or a thick coating which is flexible or rigid. Such a coating has various disadvantages, namely, it modifies the appearance of the support, it flakes off relatively rapidly, and requires frequent replacement.

A second type of coating comprises a silicone, silicate or the like which is powdered and is in liquid form. This type of coating likewise has various disadvantages, namely, the support is darkened which renders it less aesthetic in appearance, the coating loses its protective capability relatively quickly, for example, in two years.

A third type of coating guards against graffiti and unauthorized posting. In general, this type of coating is silicone, silicate or the like material based, combined with a parafin. This coating is applied on the support in a fluid form in order for it to be absorbed into the support. This type of coating also has various disadvantages: it must be replaced after each graffiti cleaning or after a few washings; it is not satisfactory both for anti-graffiti and for anti-posting coating for a long enough period, which for economic reasons should be at least two years; it cannot be applied to wet supports, even if the supports are barely damp, for example, cement which has dried for less than 28 days, it is often difficult to apply; it does not reinforce the support; in order to it to be effective, it must be applied in three or four layers; it does not resist the graffiti cleaning products; for the same product, there is no choice between matte or glossy finish; it does not make it possible to keep the support soil-resistant; it does not make it possible to clean graffiti without expensive and/or dangerous chemicals; after one or two cleanings, the support remains more or less stained and the outline of the graffiti remains in place; the cleaning operation, in terms of the manpower and cleaning products, costs too much compared with the price of the protection itself; the coating itself is expensive, both in terms of its application and its maintenance; finally, the coating does not prevent the proliferation of mosses, e.g., algae, lichens, mushrooms, and molds.

SUMMARY OF THE INVENTION

A protective coating composition which comprises at least one aliphatic polyisocyanate, at least one aromatic polyisocyanate and a solvent selected from the group consisting of esters, ketones, glycol-ether esters, and mixtures thereof. The composition may further include a hardening accelerator, or an anti-fungal agent.

In the coating composition the ester is selected from the group consisting of ethyl acetate ester and butyl acetate ester, the ketone is selected from the group consisting of methylethyl ketone and methylisobutyl ketone, and the glycol-ether ester is selected from the group consisting of ethylglycol acetate and methoxybutyl acetate.

The weight level of NCO radical in the composition is about 3–15%, and preferably about 9.5%. The weight ratio of the aliphatic polyisocyanate to the aromatic polyisocyanate is kept at about ⅔ to about 9/1, and preferably at about 7/3.

The anti-fungal agent is N-(fluorodichloromethylthio) phtalimide, and its weight percentage in the composition is about 0.1–0.2%.

The coating composition may also contain an agent for increasing glossiness and/or hardness, for example, nitrocellulose in an amount of about 0.2% by weight.

Alternatively, the composition may contain a matting agent, which is a mixture of about 10% talc and about 5% fine silica.

The coating composition according to the invention further includes an aromatic hydrocarbon as a diluting agent, for example, xylene.

The coating composition may be used to coat an article and is manufactured by mixing an aliphatic polyisocyanate and a solvent to obtain a first mixture, mixing an aromatic polyisocyanate a solvent to obtain a second mixture, and then mixing the two mixtures. the composition may further incude a hardening agent, such as 10-dibetyldilaurate, before it is applied to a support, in an amount of about 0.1–2% (preferably 0.15%) by weight of the composition.

DESCRIPTION OF PREFERRED EMBODIMENTS

It is an object of the invention to provide a novel coating which provides protection against natural and artificial elements of the type described above without suffering from the noted disadvantages.

The coating composition according to the invention comprises in combination:
at least one aliphatic polyisocyanate;
at least one aromatic polyisocyanate; and
a solvent.

According to a preferred embodiment, the coating is comprised by the combination of:
a first mixture of at least one aliphatic polyisocyanate and a solvent; and
a second mixture of at least one aromatic polyisocyanate and a solvent, the weight ratio of the polyisocyanates is from about 3/2 to 5/1, and preferably 4/1.

A hardening accelerator, which is added to the composition shortly before its application, is, for example, (10-dibutyldilaurate, and its weight level at 20° C. is from about 0.1% to 2% and, preferably 0.15%, with respect to the final product.

The solvent is selected from the group consisting of esters, particularly ethyl acetate and butyl acetate; ketones, particularly methylethylketone and methylisobutylketone; glycol ether esters, particularly ethylglycol acetates, and methoxybutyl acetate. It has been observed that white-spirit is not an appropriate solvent.

The weight level of the composition in NCO is preferably about 3–15%, and more preferably 9.5%. The weight level of isocyanate monomer is less than 0.7%.

The weight ratio of aliphatic polyisocyanate to aromatic polyisocyanate is about ⅔ to 9/1, and preferably 7/3.

Preferably, the coating composition according to the invention additionally comprises a wide spectrum anti-fungal agent, particularly N (fluorodichloromethylthio) phtalimide, in a range of about 0.1% to 0.2% by weight.

The aliphatic polyisocyanate is selected from the group consisting of 4,4-dicyclohexylmethane diisocyanate, hexamethylene, diisocyanate and 3-methyl isocyanate-3,5,5 dimethylcyclohexle diisocyanate.

The aromatic polyisocyanate is selected from the group consisting of 2-4 - and 2,6-toluene diisocyanate, and 4,4-diphenylmethane diisocyanate.

During the manufacture or application of the composition, one can add to the coating an aromatic hydrocarbon as a diluent, such as xylene.

To obtain a glossy coating, one can add about 0.2% by weight of nitrocellulose to the combination, which increases glossy finish as well as reinforces hardness of the coating.

On the contrary, if one wishes to obtain a matte finish, one can add, by weight with respect to the dry resin, up to 10% talc and 5% fine silica.

To obtain the above coating according to the preferred embodiment of the invention, one separately prepares the two mixtures by first mixing the particular polyisocyanate with the solvent, and then combines the two mixtures. These operations are carried out at colder temperatures, under agitation and in a dry environment, because the coating otherwise absorbs humidity. For this reason, as soon as it is formed, the coating is isolated from the air by completely filling it into a container, preferably a metallic container, for its storage and is transported to a site for use. The diluent may be added at any point after manufacture, and the hardening accelerator is added just before its application to a support.

The table below illustrates several properties of the first and second mixtures according to the preferred embodiment of the invention.

|  | First Mixture | Second Mixture |
| --- | --- | --- |
| Equivalent weight of NCO % | approx. 442 | approx. 1370 |
| Color Index (DIN 6162) | max. 2 | max. 5 |
| Flash Point (°C.) (DIN 53213) | approx. 52 | approx. 33 |
| Viscosity at 20° C. (mPa · s) | 600 ± 250 | 120 ± 80 |
| Velocity Gradient (S$^{-1}$) | 147 | 150 |
| Density at 20° C. (g/cm$^3$) (DIN 53217) | 1.05 | 1.02 |

The coating according to the invention can be applied to a wide variety of supports: projected films, wall paper, paintings, tiling, tiles, cement, bricks, natural or artificial stone, cement coated articles, synthetic coating, marbles, woods, non-ferrous metals, etc.

The coating according to the invention has excellent hydrofugal, oleofugal, anti-graffiti, and anti-posting (particularly by gluing) qualities on its exterior surface.

The coating of the invention has, on moist supports, a very satisfactory adherance by virtue of the fact that it has a high chemical affinity for moisture, as opposed to the conventional silicone or the like-based coatings. As a result, when it is being coated on a cement surface, one can proceed without having to wait until the cement is completely dry and one can proceed after about eight days. For example, with prefabricated cement, the coating according to the invention can be applied right in the factory.

By virtue of a low color index, the coating does not substantially modify the appearance of the support, and forms a shield against exterior elements. It is highly resisitant to oils, solvents, acids and bases. Whether having a matte or a glossy finish, it considerably increases the mechanical resistance of the material. It allows for the elimination of all paints, from a can or aerosol container, inks, tincture of iodine, mercurochrome, bitumen, oil tar, motor oil, a wide variety of oil-based materials, vegetable stains, fruit juices, etc. It also prevents the natural growth of mushrooms, mosses, lichens, and algae. It is, moreover, soil-resistant by virtue of its substantial resistance to chemical products, and it need not be reapplied after the removal of graffiti using cleaning gel. In a case where the support is made of a combustible material, for example, wood, it diminishes the inflammability thereof. In the case of localized accidental destruction, it can easily be repaired. In the case of posters, which are glued or which are self-adhesive, the removal thereof is achieved by simply peeling. It does not turn yellow in sunlight and is not sensitive to ultra-violet rays.

For an application of the coating on a support, one can utilize various techniques including painting, either with a brush or a spray, in one or two layers. The support, which can be slightly moist, must first be cleaned of to remove all dirt, dust, grease, old paint, grout, crumbly portions. After its application, the coating must be protected from rain and dust for approximatley 4 hours at a temperature of 15° C. This drying time can be adjusted by adding a hardening accelerator.

As it is clear from what is stated above, the invention provides a coating which can be applied on a variety of supports and which, among other properties, protects the support against natural and artificial elements.

Since the coating according to the invention has a low level of isocyanate monomer, it is not harmful and does not require any more precautions than that which are taken when using hydrocarbons.

According to a preferred embodiment, one mixes and agitates cold, using cold portions, 160 parts of hexamethylene diisocyanate and 60 parts of ethylglycol acetate, diluted with 140 parts of xylene.

It should be understood that the invention is not limited to particular embodiments disclosed above and is further not limited to the particular means, materials, compositions, and substrates specifically noted above and extends to all equivalents within the scope of the appended claims.

What is claimed is:

1. A protective coating composition comprising:
   (a) at least one aliphatic polyisocyanate;
   (b) at least one aromatic polyisocyanate; and
   (c) a solvent.

2. The coating composition as defined by claim 1, further comprising a hardening accelerator.

3. The coating composition as defined by claim 1, wherein said solvent is selected from the group consisting of esters, ketones, glycolether esters, and mixtures thereof.

4. The coating composition as defined by claim 3, wherein said ester is selected from the group consisting of ethyl acetate ester and butyl acetate ester.

5. The coating composition as defined by claim 3, wherein said ketone is selected from the group consisting of methylethyl ketone and methylisobutyl ketone.

6. The coating composition as defined by claim 3, wherein said glycolether ester is selected from the group consisting of ethylglycol acetate and methoxybutyl acetate.

7. The coating composition as defined by claim 1, wherein the combined weight of NCO substituent in the aliphatic polyisocyanate and the aromatic polyisocyanate is about 3–15%.

8. The coating composition as defined by claim 1, wherein the combined weight of NCO substituent in the aliphatic polyisocyanate and the armoatic polyisocyanate is about 9.5%.

9. The coating composition as defined by claim 1, wherein the weight ratio of said aliphatic polyisocyanate to said aromatic polyisocyanate is about ⅔ to about 9/1.

10. The coating composition as defined by claim 1, wherein the weight ratio of said aliphatic polyisocyanate to said aromatic polyisocyanate is 7/3.

11. The coating composition as defined by claim 1, further comprising an anti-fungal agent.

12. The coating composition as defined by claim 11, wherein said anti-fungal agent is N-(fluorodichloromethylthio) phtalimide.

13. The coating composition as defined by claim 11, wherein the percentage of said anti-fungal agent is about 0.1–0.2% by weight.

14. The coating composition as defined by claim 1, further comprising an agent for increasing glossiness and/or hardness.

15. The coating composition as defined by claim 14, wherein said glossiness and/or hardening agent is nitrocellulose.

16. The coating composition as defined by claim 15, wherein said nitrocellulose is present in an amount of about 0.2% by weight.

17. The coating composition as defined by claim 1, further comprising an agent to produce matty finish.

18. The coating composition as defined by claim 17, wherein said matting agent comprises about 10% talc and about 5% fine silica.

19. The coating composition as defined by claim 1, further comprising a diluting agent.

20. The coating composition as defined by claim 19, wherein said diluting agent is an aromatic hydrocarbon.

21. The coating composition as defined by claim 20, wherein said aromatic hydrocarbon is xylene.

22. A coating composition comprising:
(a) a first mixture of at least one aliphatic polyisocyanate and a solvent; and
(b) a second mixture of at least one aromatic polyisocyanate and a solvent.

23. The composition as defined by claim 22, wherein the total weight ratio of the solvent to the total weight of the first mixture is ¼.

24. The composition as defined by claim 22, wherein the total weight ratio of the solvent to the total weight of the second mixture is 1/1.

25. The composition as defined by claim 22, wherein the weight ratio of the aromatic polyisocyanate to the second mixture is about 3/2 to 5/1.

26. The composition as defined by claim 22, wherein the weight ratio of the aromatic polyisocyanate to the second mixture is 4/1.

27. The composition as defined by claim 22, wherein the aliphatic polyisocyanate is selected from the group consisting of 4,4'-dicyclohexylmethane diisocyanate, hexamethylene diisocyanate and 3-methylisocyanate-3,5,5 dimethylcyclohexyle isocyanate.

28. The composition as defined by claim 22, wherein the aromatic polyisocyanate is selected from the group consisting of 2,4- and 2-6 toluene diisocyanate and 4,4-diphenylmethane diisocyanate, and mixtures thereof.

29. The composition as defined by claim 22, wherein the weight proportion of the isocyanate monomer is less than about 0.7%.

30. A process for forming a coating composition, comprising the steps of:
(a) mixing an aliphatic polyisocyanate and a solvent to form a first mixture;
(b) mixing an aromatic polyisocyanate and a solvent to form a second mixture; and
(c) intermixing the first and second mixtures.

31. The process is defined by claim 30, further comprising adding a hardening agent to the composition shortly before application to a support.

32. The process as defined by claim 30, wherein step (c) of intermixing the first and second mixtures is carried out at colder temperatures and in a dry atmosphere.

33. The process as defined by claim 32, further comprising keeping the mixture obtained in (c) insulated from the air by completely filling the mixture into a metallic container.

34. The coating composition as defined by claim 2, wherein said hardening accelerator is 10-dibutyldilaurate.

35. The coating composition as defined by claim 2, wherein said hardening accelerator is present in an amount of about 0.1–2% by weight of the composition.

36. The coating composition as defined by claim 2, wherein said hardening accelerator is present in an amount of about 0.15% by weight of the composition.

37. An article including a protective coating composition, said composition comprising:
(a) at least one aliphatic polyisocyanate;
(b) at least one aromatic polyisocyanate; and
(c) a solvent selected from the group consisting of esters, ketones, glycoether esters, and mixtures thereof.

38. The article as defined by claim 37, wherein said ester is selected from the group consisting of ethyl acetate ester and butyl acetate ester, said ketone is selected from the group consisting of methylethyl ketone and methylisobutyl ketone, and said glycolether is selected from the group consisting of ethylglycol acetate and methoxybutyl acetate.

39. The article as defined by claim 37, wherein said composition comprises an anti-fungal agent.

40. The article as defined by claim 37, wherein said composition comprises an aromatic hydrocarbon as a diluting agent.

41. The article as defined by claim 37, wherein the weight ratio of said aliphatic polyisocyanate to said aromatic polyisocyanate is about ⅔ to 9/1.

42. The article is defined by claim 37, wherein the weight ratio of said aliphatic polyisocyanate to said aromatic polyisocyanate is 7/3.

43. The article as defined by claim 39, wherein said anti-fungal agent is N-(flurodichloromethylthio)phtalimide.

* * * * *